United States Patent
Tashiro et al.

(10) Patent No.: US 11,628,386 B2
(45) Date of Patent: Apr. 18, 2023

(54) FILTRATION DEVICE

(71) Applicant: BUNRI INCORPORATION, Miyazaki (JP)

(72) Inventors: Minoru Tashiro, Tokyo (JP); Makoto Tashiro, Tokyo (JP)

(73) Assignee: BUNRI INCORPORATION, Miyazaki (JP)

(*) Notice: Subject to any disclaimer, the term of this patent is extended or adjusted under 35 U.S.C. 154(b) by 226 days.

(21) Appl. No.: 16/817,004

(22) Filed: Mar. 12, 2020

(65) Prior Publication Data

US 2020/0206662 A1 Jul. 2, 2020

Related U.S. Application Data

(63) Continuation of application No. PCT/JP2018/030697, filed on Aug. 20, 2018.

(30) Foreign Application Priority Data

Sep. 13, 2017 (JP) .............................. JP2017-176078

(51) Int. Cl.
*B01D 33/46* (2006.01)
*B01D 33/74* (2006.01)
(Continued)

(52) U.S. Cl.
CPC .......... *B01D 33/463* (2013.01); *B01D 33/00* (2013.01); *B01D 33/333* (2013.01); *B01D 33/74* (2013.01)

(58) Field of Classification Search
None
See application file for complete search history.

(56) References Cited

U.S. PATENT DOCUMENTS 1,627,550 A * 5/1927 Bachmann ........... B01D 33/073
210/791
1,769,655 A * 7/1930 Sterling ............... B01D 33/073
210/318

(Continued)

FOREIGN PATENT DOCUMENTS

CN 1383907 A 12/2002
CN 2858031 Y 1/2007

(Continued)

OTHER PUBLICATIONS

International Search Report dated Nov. 6, 2018 in connection with PCT International Application No. PCT/JP2018/030697.

(Continued)

*Primary Examiner* — Robert J Popovics
(74) *Attorney, Agent, or Firm* — John P. White

(57) ABSTRACT

A filtering device includes a filter tank, a first drum filter both ends of which are supported, and a cantilever second drum filter. A first end portion of the first drum filter is supported on a first sidewall of the filter tank. A second end portion of the first drum filter is supported on a second sidewall. An end portion of the second drum filter on the supported side is supported on the first sidewall. Between an end portion of the second drum filter on the non-supported side and the second sidewall, a communicating part is formed. A first jetting section jets a fluid against an outer circumferential surface of the first drum filter. A second jetting section is arranged in the vicinity of the second drum filter and jets the fluid against the second drum filter.

12 Claims, 7 Drawing Sheets

(51) Int. Cl.
  *B01D 33/00* (2006.01)
  *B01D 33/333* (2006.01)

(56) References Cited

U.S. PATENT DOCUMENTS

| | | | | |
|---|---|---|---|---|
| 1,904,066 A * | 4/1933 | Mcarthur | D06B 5/00 | 210/395 |
| 2,267,086 A * | 12/1941 | Donohue | B01D 33/463 | 210/779 |
| 2,876,904 A * | 3/1959 | Fowler | B01D 33/04 | 210/387 |
| 2,877,901 A * | 3/1959 | Maus | B23Q 11/1069 | 210/391 |
| 2,969,880 A * | 1/1961 | Lundholm | B01D 33/09 | 210/402 |
| 3,455,457 A * | 7/1969 | Popelar | B01D 21/12 | 210/167.04 |
| 3,570,671 A * | 3/1971 | Crandall | B01D 33/766 | 210/174 |
| 3,667,602 A * | 6/1972 | Crandall | B01D 33/465 | 210/779 |
| 3,784,017 A * | 1/1974 | Arnold | B01D 33/801 | 210/402 |
| 3,795,316 A * | 3/1974 | Wood | B01D 21/34 | 210/312 |
| 3,820,342 A * | 6/1974 | Stipanov | E02B 8/085 | 405/83 |
| 3,840,120 A * | 10/1974 | Greenberg | B01D 21/04 | 210/197 |
| 3,935,105 A * | 1/1976 | McEwen | B01D 21/245 | 210/138 |
| 4,394,272 A * | 7/1983 | Damerau | B01D 29/05 | 210/791 |
| 4,421,645 A * | 12/1983 | Creps | B01D 29/606 | 210/260 |
| 4,421,647 A * | 12/1983 | Estabrook | B01D 29/096 | 210/387 |
| 4,440,642 A * | 4/1984 | Frese | B23Q 11/1069 | 210/387 |
| 4,514,301 A * | 4/1985 | Parshall | B01D 29/096 | 210/416.1 |
| 4,518,496 A * | 5/1985 | Kanekubo | B03C 1/22 | 210/222 |
| 4,544,060 A * | 10/1985 | Enomoto | B65G 54/02 | 198/690.1 |
| RE32,135 E * | 5/1986 | Creps | B01D 29/6476 | 210/260 |
| 4,618,430 A * | 10/1986 | Favret, Jr. | B03D 1/242 | 210/776 |
| 4,724,077 A * | 2/1988 | Uchiyama | B01D 33/11 | 210/403 |
| 4,735,730 A * | 4/1988 | Bratten | B01D 29/606 | 210/791 |
| 4,750,920 A * | 6/1988 | Manuel | B01D 33/048 | 96/204 |
| 4,751,006 A * | 6/1988 | Becker | B01D 21/12 | 210/387 |
| 4,895,647 A * | 1/1990 | Uchiyama | B01D 35/16 | 210/402 |
| 4,992,167 A * | 2/1991 | Uchiyama | B01D 33/76 | 210/402 |
| 5,078,256 A * | 1/1992 | Hatano | B24B 53/001 | 409/137 |
| 5,167,839 A * | 12/1992 | Widmer, II | B01D 21/2455 | 198/716 |
| 5,205,686 A * | 4/1993 | de Caussin | B23Q 11/0057 | 409/137 |
| 5,217,613 A * | 6/1993 | Tashiro | B01D 21/0012 | 210/402 |
| 5,221,469 A * | 6/1993 | Nehls | B01D 29/94 | 210/167.04 |
| 5,230,793 A * | 7/1993 | Lenhart | B01D 35/12 | 184/6.24 |
| 5,279,734 A * | 1/1994 | Nehls | B01D 29/606 | 210/345 |
| 5,328,611 A * | 7/1994 | Lenhart | B01D 35/16 | 210/402 |
| 5,417,849 A * | 5/1995 | McEwen | B01D 33/807 | 210/167.04 |
| 5,565,112 A * | 10/1996 | Bratten | B01D 29/52 | 210/791 |
| 5,569,382 A * | 10/1996 | Reynders | B01D 33/745 | 210/406 |
| 5,582,740 A * | 12/1996 | McEwen | B01D 33/74 | 210/167.04 |
| 5,601,729 A * | 2/1997 | Bratten | B01D 29/902 | 210/387 |
| 5,603,846 A * | 2/1997 | Uchiyama | B01D 33/37 | 210/402 |
| 5,624,579 A * | 4/1997 | Bratten | B01D 29/096 | 210/387 |
| 5,637,213 A * | 6/1997 | McEwen | B01D 35/16 | 210/402 |
| 5,662,812 A * | 9/1997 | McEwen | B23Q 11/0057 | 210/167.01 |
| 5,738,782 A * | 4/1998 | Schafer | B01D 21/0012 | 210/171 |
| 5,800,104 A * | 9/1998 | Miyano | B01D 21/32 | 409/137 |
| 5,820,756 A * | 10/1998 | McEwen | B01D 29/41 | 210/488 |
| 5,858,218 A * | 1/1999 | Setlock | B01D 29/945 | 210/197 |
| 5,871,643 A * | 2/1999 | Ota | B01D 33/803 | 210/402 |
| 5,961,828 A * | 10/1999 | McEwen | B01D 21/20 | 475/167 |
| 5,961,847 A * | 10/1999 | Creps | B01D 29/6484 | 210/400 |
| 5,992,642 A * | 11/1999 | Ota | B01D 33/056 | 210/402 |
| 6,017,446 A * | 1/2000 | Harms | B23Q 11/1069 | 210/194 |
| 6,035,996 A * | 3/2000 | Swift | B65G 45/22 | 198/495 |
| 6,042,726 A * | 3/2000 | Anderson | B23Q 11/1069 | 210/406 |
| 6,066,255 A * | 5/2000 | Anderson | B23Q 11/1069 | 210/400 |
| 6,258,267 B1 * | 7/2001 | Ota | B01D 33/073 | 210/402 |
| 6,332,983 B1 * | 12/2001 | Tashiro | B23Q 11/0057 | 210/402 |
| 6,355,167 B1 * | 3/2002 | Wensauer | B01D 29/96 | 210/411 |
| 6,357,576 B1 * | 3/2002 | Enomoto | B01D 21/2461 | 210/531 |
| 6,475,377 B1 * | 11/2002 | Fox | B01D 29/70 | 210/90 |
| 6,500,339 B2 * | 12/2002 | Ogasawara | B01D 21/2455 | 210/411 |
| 6,511,597 B2 * | 1/2003 | Hori | B23Q 11/1069 | 210/523 |
| 6,551,516 B1 * | 4/2003 | Castleberry | B01D 21/2433 | 210/776 |
| 6,571,959 B1 * | 6/2003 | Moore | B01D 33/37 | 210/402 |
| 6,601,691 B1 * | 8/2003 | Enomoto | B23Q 11/0057 | 198/495 |
| 6,612,445 B2 * | 9/2003 | Bratten | B01D 29/64 | 209/307 |
| 6,626,285 B2 * | 9/2003 | Enomoto | B23Q 37/00 | 198/581 |
| 6,676,833 B2 * | 1/2004 | Castleberry | B01D 21/04 | 210/776 |
| 6,695,122 B2 * | 2/2004 | Enomoto | B23Q 11/0057 | 210/531 |
| 6,835,315 B2 * | 12/2004 | Fox | B01D 33/801 | 210/739 |

(56) References Cited

U.S. PATENT DOCUMENTS

| | | | | |
|---|---|---|---|---|
| 6,899,807 B2* | 5/2005 | Cummings | ............ | B01D 29/01 210/531 |
| 7,014,760 B2* | 3/2006 | Ackermanns | ........ | B01D 33/801 210/402 |
| 7,014,764 B2* | 3/2006 | Ackermanns | ........ | B01D 33/067 210/402 |
| 7,044,696 B2* | 5/2006 | Hiramoto | ............... | B23Q 1/015 409/137 |
| 7,115,200 B2* | 10/2006 | Ackermanns | .......... | B01D 33/76 210/402 |
| 7,364,032 B2* | 4/2008 | Nisiguchi | .......... | B23Q 11/0057 409/137 |
| 7,364,652 B2* | 4/2008 | Middleton | ................ | E03F 5/12 210/170.03 |
| 7,381,335 B2* | 6/2008 | Lee | ...................... | B01D 33/461 210/402 |
| 7,395,935 B2* | 7/2008 | Tashiro | .................. | B01D 33/76 210/402 |
| 7,410,569 B1* | 8/2008 | Tilev | ................. | B01D 21/0012 210/411 |
| 7,485,226 B2* | 2/2009 | Ackermanns | .......... | B01D 33/76 210/402 |
| 7,563,369 B2* | 7/2009 | Ackermanns | .......... | B01D 33/76 210/402 |
| 7,638,061 B2* | 12/2009 | Moore | .................... | B03C 1/286 210/167.04 |
| 7,648,632 B2* | 1/2010 | Ackermanns | ...... | B23Q 11/1069 210/402 |
| 7,824,547 B2* | 11/2010 | Reynders | ................ | B01D 29/09 210/171 |
| 7,913,854 B2* | 3/2011 | Bratten | ................ | B01D 33/056 210/400 |
| 8,029,670 B2* | 10/2011 | Dietenhauser | ......... | B01D 33/41 210/406 |
| 8,048,302 B2* | 11/2011 | Corsaro | ................. | B01D 33/41 210/400 |
| 8,499,922 B2* | 8/2013 | Hoshi | ................ | B23Q 11/0057 198/494 |
| 9,339,907 B2* | 5/2016 | Matsuyama | ........ | B23Q 11/0057 |
| 9,382,071 B2* | 7/2016 | Matsuyama | ........ | B23Q 11/0057 |
| 9,415,475 B2* | 8/2016 | Tak | .................... | B23Q 11/0057 |
| 9,694,459 B2* | 7/2017 | Kakutani | ............. | B01D 21/2455 |
| 10,518,374 B2* | 12/2019 | Matsuyama | ........ | B01D 33/50 |
| 10,561,970 B2* | 2/2020 | Tashiro | ................. | B01D 33/06 |
| 2001/0006157 A1* | 7/2001 | Ogasawara | ............ | B01D 29/01 210/171 |
| 2002/0134648 A1* | 9/2002 | Enomoto | ........... | B23Q 11/0057 198/495 |
| 2002/0139722 A1* | 10/2002 | Bratten | .................. | B01D 33/76 209/307 |
| 2002/0166808 A1* | 11/2002 | Hori | ................... | B23Q 11/0057 210/526 |
| 2003/0010705 A1* | 1/2003 | Lenhart | ................. | B01D 33/50 210/402 |
| 2003/0010723 A1* | 1/2003 | Fox | ...................... | B01D 29/606 210/780 |
| 2003/0183582 A1* | 10/2003 | Castleberry | ........ | B01D 17/0205 210/703 |
| 2004/0245149 A1* | 12/2004 | Ackermanns | ...... | B23Q 11/0057 209/1 |
| 2004/0262242 A1* | 12/2004 | Middleton | .............. | E02B 8/026 210/396 |
| 2005/0000880 A1* | 1/2005 | Ackermanns | .......... | B01D 33/76 210/312 |
| 2005/0061727 A1* | 3/2005 | Ackermanns | ........ | B01D 33/466 210/238 |
| 2006/0049112 A1* | 3/2006 | C. Moore | ................. | B03C 1/10 210/695 |
| 2006/0113238 A1* | 6/2006 | Ackermanns | ........ | B01D 33/801 210/248 |
| 2006/0124523 A1* | 6/2006 | Ackermanns | ........ | B01D 33/073 210/171 |
| 2006/0131227 A1* | 6/2006 | Pahl | ...................... | B01D 33/056 210/400 |
| 2007/0029248 A1* | 2/2007 | Ackermanns | ...... | B23Q 11/0057 210/299 |
| 2007/0051672 A1* | 3/2007 | Reynders | ............... | B01D 33/04 210/171 |
| 2007/0181492 A1* | 8/2007 | Uchiyama | ............ | B01D 33/073 210/402 |
| 2007/0210013 A1* | 9/2007 | Bratten | ................ | B01D 33/056 210/387 |
| 2008/0035554 A1* | 2/2008 | Tashiro | .............. | B23Q 11/1069 210/402 |
| 2009/0152186 A1* | 6/2009 | Corsaro | .................. | B01D 33/76 210/231 |
| 2010/0320158 A1* | 12/2010 | Mahas | ............... | B23Q 11/0057 210/167.04 |
| 2011/0005985 A1* | 1/2011 | Dietenhauser | ......... | B01D 33/41 210/171 |
| 2012/0079928 A1* | 4/2012 | Hoshi | ................ | B23Q 11/0057 83/78 |
| 2013/0193056 A1* | 8/2013 | Tashiro | .............. | B23Q 11/1069 210/324 |
| 2014/0054244 A1* | 2/2014 | Towers | ............... | B23Q 11/0057 210/257.1 |
| 2018/0065223 A1* | 3/2018 | Suzuki | ............... | B23Q 11/0067 |
| 2018/0272488 A1* | 9/2018 | Matsuyama | ........... | B01D 29/56 |
| 2018/0280841 A1* | 10/2018 | Tashiro | .................. | B01D 33/41 |
| 2018/0296950 A1* | 10/2018 | Yang | ........................ | C22B 1/005 |
| 2020/0206662 A1* | 7/2020 | Tashiro | ................. | B01D 33/801 |
| 2022/0111477 A1* | 4/2022 | Funakoshi | ............. | B01D 33/76 |

FOREIGN PATENT DOCUMENTS

| | | | | |
|---|---|---|---|---|
| CN | 101316681 A | 12/2008 | | |
| CN | 201855611 U | 6/2011 | | |
| CN | 103189121 A | 7/2013 | | |
| CN | 103551909 A | 2/2014 | | |
| CN | 205627292 U | 10/2016 | | |
| EP | 3685898 A1 * | 7/2020 | ............. | B01D 24/38 |
| EP | 3685898 A4 * | 6/2021 | ............. | B01D 24/38 |
| JP | H9-75621 A | 3/1997 | | |
| JP | H9-290106 A | 11/1997 | | |
| JP | 2000-93713 A | 4/2000 | | |
| JP | 2000-167317 A | 6/2000 | | |
| JP | 3453689 B2 | 10/2003 | | |
| JP | 2014-205218 A | 10/2014 | | |
| JP | 2015-44266 A | 3/2015 | | |
| JP | 6375424 B1 * | 8/2018 | ............. | B01D 24/38 |
| JP | 2019051460 A * | 4/2019 | ............. | B01D 24/38 |
| WO | WO-2017110219 A1 * | 6/2017 | ............. | B01D 33/06 |
| WO | WO-2019054134 A1 * | 3/2019 | ............. | B01D 24/38 |

OTHER PUBLICATIONS

Written Opinion (form PCT/ISA/237) dated Nov. 6, 2018 in connection with PCT International Application No. PCT/JP2018/030697.

Chinese official action (and machine translation thereof into English) dated Mar. 30, 2021 in corresponding Chinese Patent Application No. 201880059259.X.

European search report dated May 4, 2021 in corresponding European Patent Application No. 18855894.4.

* cited by examiner

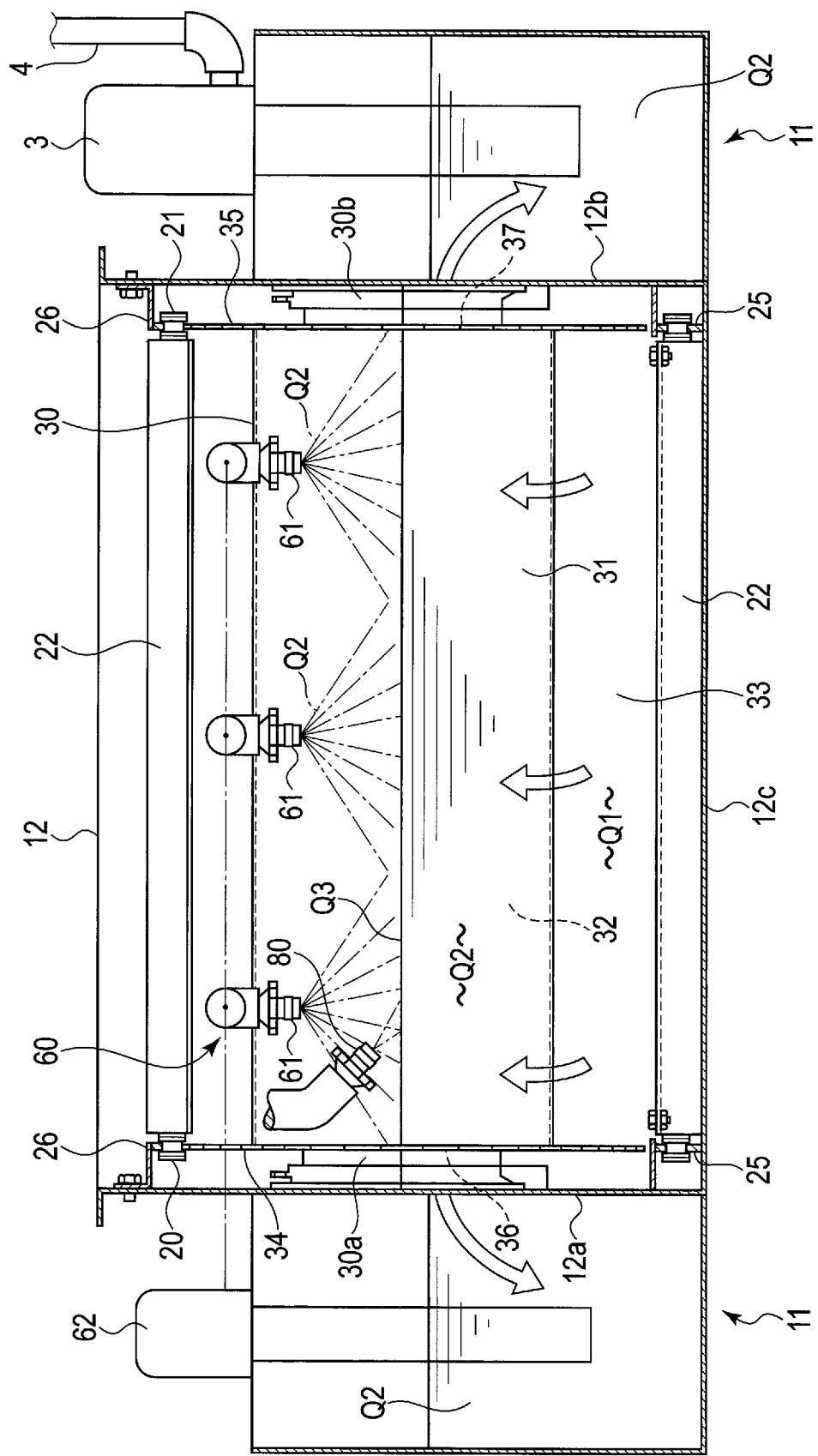
F I G. 3

FILTRATION DEVICE

CROSS-REFERENCE TO RELATED APPLICATIONS

This application is a Continuation Application of PCT Application No. PCT/JP2018/030697, filed Aug. 20, 2018 and based upon and claiming the benefit of priority from prior Japanese Patent Application No. 2017-176078, filed Sep. 13, 2017, the entire contents of all of which are incorporated herein by reference.

BACKGROUND OF THE INVENTION

1. Field of the Invention

The present invention described herein relate generally to a filtering device configured to purify, for example, a liquid mixed with shavings or minute particles.

2. Description of the Related Art

In a machine tool configured to carry out machining such as cutting and grinding, a coolant (cutting fluid) is used in order to cool the workpiece or tool. A coolant that has been used for machining is mixed with an object to be removed such as shavings (chips) and minute particles. In recent machine tools, the object to be removed is liable to diversify. In order to purify and reuse such a coolant, heretofore various filtering devices have been proposed.

For example, a filtering device described in each of Patent Literature 1 (JP 2000-093713 A) and Patent Literature 2 (JP 2000-167317 A) is provided with a storage tank, filtering drum arranged inside the storage tank, scraper conveyor configured to scoop up chips in the storage tank, and jetting means for jetting a fluid against the filtering drum (drum filter). The jetting means described in each of Patent Literatures 1 and 2 jets a fluid against the filtering drum from outside the filtering drum. A fluid processing device described in Patent Literature 3 (JP 3453689 B) is provided with a tank storing therein a fluid to be processed, rotating drum arranged inside this tank, filter provided on the rotating drum, and jet nozzle configured to jet a cleaning fluid from inside the filter.

In order to enhance the filtering capability it is desired that a plurality of drum filters be used. The filtering device described in each of Patent Literatures 1 and 2, jets the fluid against an upper part of the drum filter exposed at the fluid surface from outside the drum filter. In such a filtering device, if a plurality of drum filters are arranged in parallel with each other, inflow parts through which the fluid hardly flows are formed between drums adjacent to each other. In the vicinity of the fluid surface of each inflow part, sludge stagnates and accumulates. In this case, the sludge stays in the vicinity of the fluid surface of each part between the adjacent drums for a long time, and the amount of the sludge increases with the lapse of time, whereby a cause of various problems is created.

BRIEF SUMMARY OF THE INVENTION

Accordingly, the present invention described herein aim to provide a filtering device having a high degree of filtering capability, capable of preventing the drum filter from clogging, and furthermore capable of efficiently discharging sludge existing in the vicinity of the fluid surface.

One embodiment relates to a filtering device comprises a filter tank comprising a first sidewall and a second sidewall opposed to each other, a first drum filter comprising supported both ends, a cantilever second drum filter supported only one end, a drive mechanism, a first jetting section, a second jetting section and a conveyor. The drive mechanism is configured to rotate the first drum filter and the second drum filter. The first jetting section is configured to jet a fluid against an outer circumferential surface of the first drum filter. The second jetting section is configured to jet the fluid against an outer circumferential surface of the second drum filter. The conveyor is configured to discharge the sludge inside the filter tank to the outside of the filter tank. The first drum filter comprises a first end portion supported on the first sidewall and a second end portion supported on the second sidewall. The cantilever second drum filter comprises an end portion on the supported side supported on the first sidewall. A communicating part is formed between an end portion of the second drum filter on the non-supported side portion and the second sidewall.

A filtering device of the present invention uses a plurality of drum filters (at least the first drum filter and the second drum filter), and thus has a high degree of filtering capability. Moreover, the filtering device can remove the object to be removed such as sludge and the like adhering to these drum filters by means of the first jetting section and the second jetting section. The sludge removed from the first drum filter by the first jetting section falls into a fluid inflow part between the first drum filter and second drum filter. In the present invention, the communicating part is formed between the end portion of a cantilever second drum on the non-supported side thereof and sidewall of the filter tank. Accordingly, it is possible to prevent sludge from collecting in the vicinity of the fluid surface between the first drum filter and second drum filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a cross-sectional view of the filtering device along line F3-F3 in FIG. 1.

DETAILED DESCRIPTION OF THE INVENTION

Hereinafter, a filtering device according to a first embodiment will be described with reference to FIGS. 1 to 5.

Figure 1:
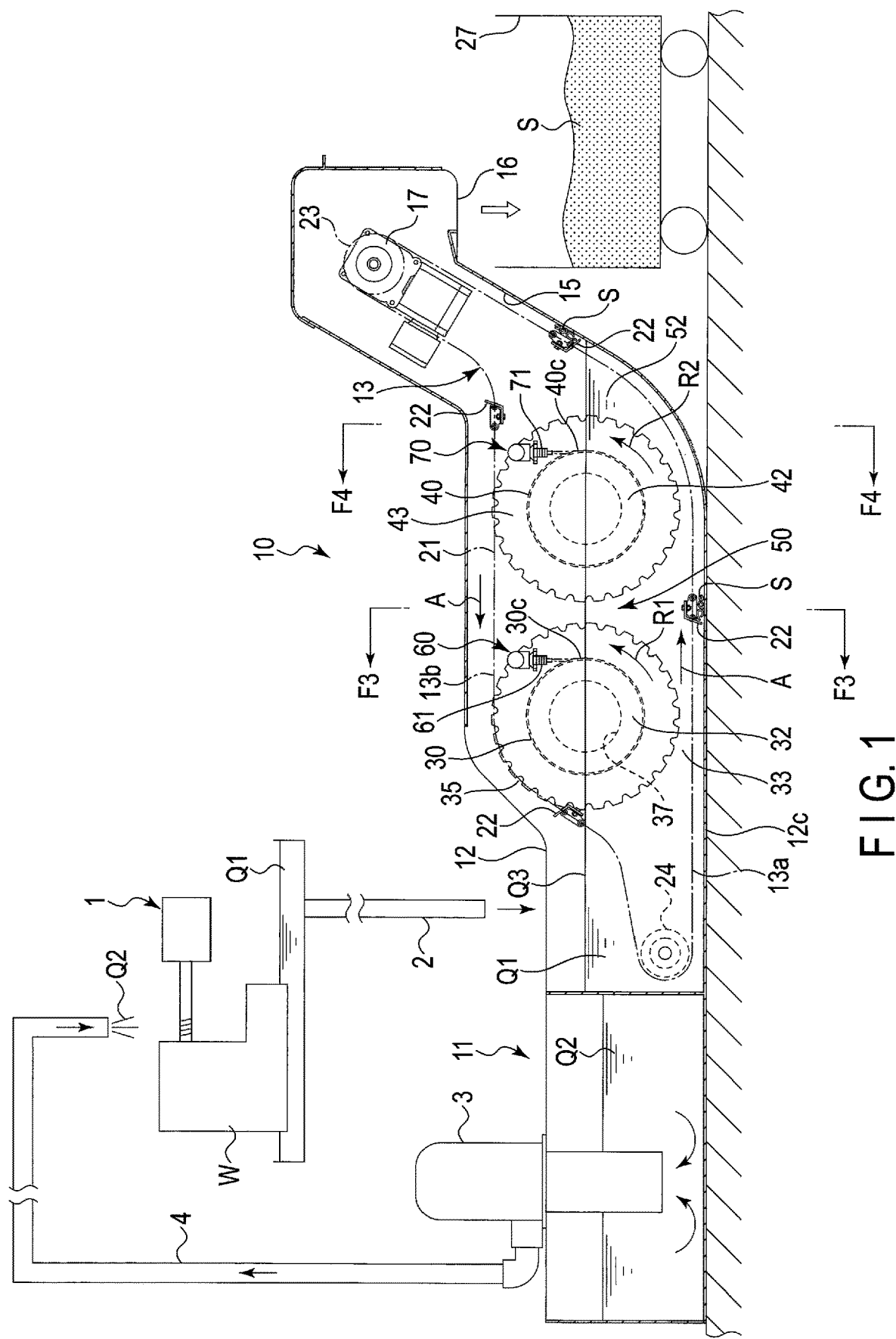
FIG. 1 is a cross-sectional view of a filtering device according to a first embodiment.

FIG. 1 shows an outline of the equipment configured to remove foreign substances from a coolant (cutting fluid) to be used for a machine tool 1 such as a machining center. An example of a fluid Q1 to be filtered is a coolant discharged from the machine tool 1 configured to machine a workpiece W. In this fluid Q1, an object to be removed such as shavings and minute particles created by cutting and grinding is contained.

The fluid Q1 containing therein the object to be removed is supplied to a filtering device 10 through a flow path 2. This fluid Q1 is filtered by the filtering device 10, is made a clean fluid Q2, and the fluid Q2 flows into a clean tank 11. The clean fluid Q2 is drawn up by a pump 3 and is thereafter supplied to the machine tool 1 again through a supply flow path 4.

Hereinafter, details of the filtering device 10 will be described.

Figure 2:
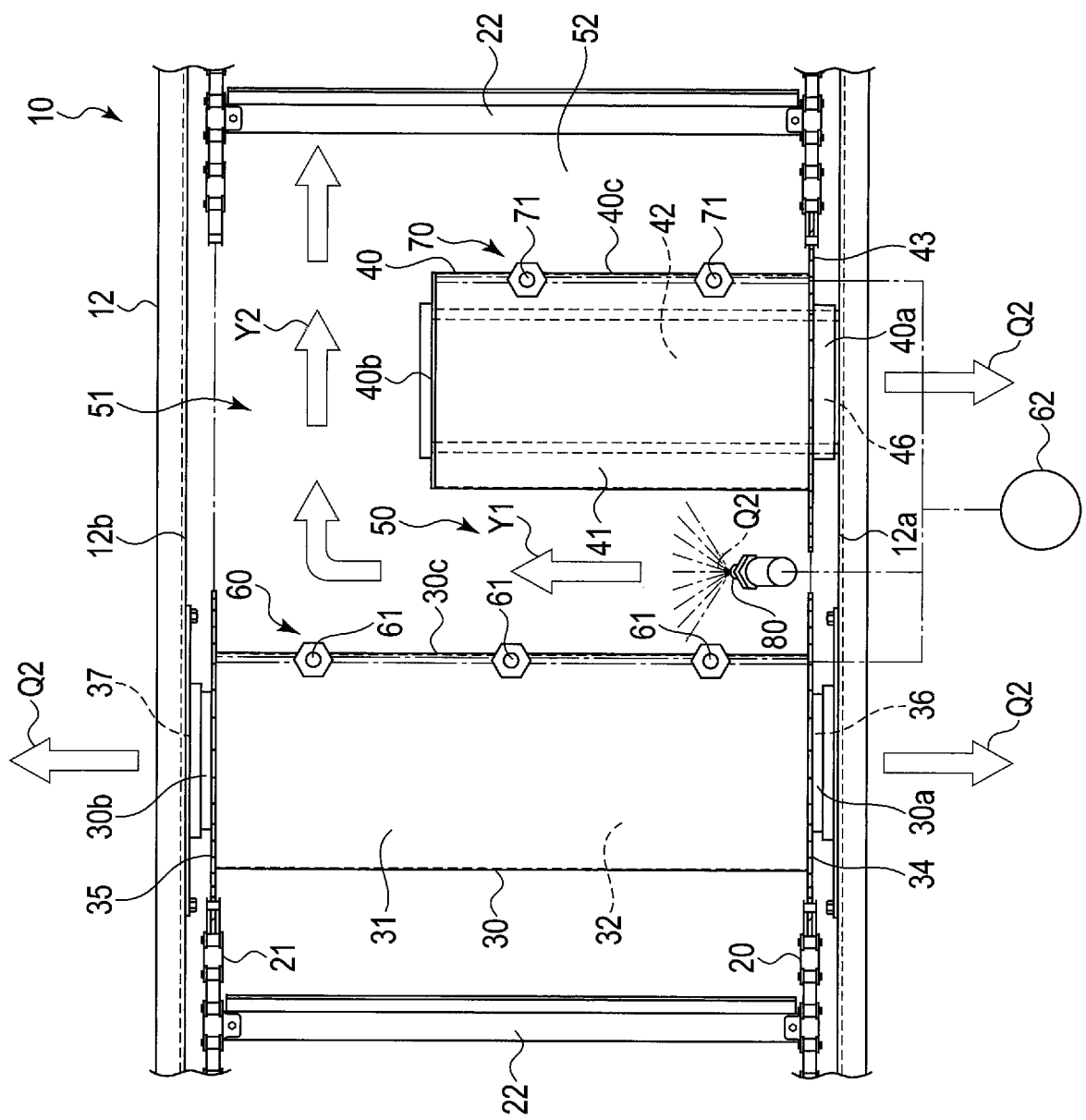
FIG. 2 is a plan view of part of the filtering device.

FIG. 1 is a cross-sectional view of the filtering device 10 and FIG. 2 is a plan view of part of the filtering device 10. The filtering device 10 includes a filter tank 12 accommodating therein the fluid Q1 to be filtered, and conveyor (scraper conveyor) 13 configured to take out the object to be removed inside the filter tank 12. The fluid Q1 to be filtered is supplied to the filter tank 12 through the flow path 2. The clean tank 11 is arranged in the vicinity of the filter tank 12. As shown in FIG. 2 and FIG. 3, the filter tank 12 includes a first sidewall 12a and second sidewall 12b opposed to each other.

As shown in FIG. 1, a sludge takeout path 15 is formed at an end of the filter tank 12. The sludge takeout path 15 extends diagonally upward from a bottom portion 12c of the filter tank 12 and further extends to the outside of the filter tank 12. A discharging section 16 is formed at an upper end of the sludge takeout path 15. The discharging section 16 is provided at a position higher than the fluid surface Q3 of the filter tank 12. In the vicinity of the discharging section 16, a drive mechanism 17 employing a motor as the drive source is provided.

The conveyor 13 is arranged in such a manner as to extend from the bottom portion 12c of the filter tank 12 to the discharging section 16. This conveyor 13 includes a pair of chains 20 and 21 and a plurality of scrapers 22. The chains 20 and 21 are respectively wound around an upper sprocket wheel 23 and lower sprocket wheel 24, and are moved by the drive mechanism 17 in a direction indicated by an arrow A in FIG. 1. The chains 20 and 21 are supported by guide members 25 and 26 (shown in FIG. 3 and FIG. 4) arranged in the filter tank 12. The scrapers 22 are provided at predetermined intervals in the longitudinal direction of the chains 20 and 21.

As shown in FIG. 1, the conveyor 13 includes a lower part 13a and upper part 13b. The lower part 13a moves toward the discharging section 16 along the bottom portion 12c of the filter tank 12 and sludge takeout path 15. The upper part 13b moves from the upper sprocket wheels 23 toward the lower sprocket wheels 24. The sludge S such as shavings and the like sunken on the bottom portion 12c of the filter tank 12 is sent by the scrapers 22 from the bottom portion 12c to the discharging section 16 through the sludge takeout path 15. The sludge S reaching the discharging section 16 falls toward a collection box 27 (shown in FIG. 1).

In the filtering device 10, a first drum filter 30 and second drum filter 40 are accommodated. The first drum filter 30 and second drum filter 40 are arranged between the lower part 13a and upper part 13b of the conveyor 13. Moreover, the first drum filter 30 and second drum filter 40 are arranged in parallel with each other and substantially in horizontal positions.

The first drum filter 30 includes a cylindrical filter main body 31. The filter main body 31 may be formed of, for example, a perforated plate obtained by forming a large number of filtering throughflow holes in a metallic plate or may be a meshed member having filtering throughflow holes. A filter main body 31 constituted of a composite material formed by overlaying a meshed member on the outside of a perforated plate may also be employed. Inside the filter main body 31, an inflow chamber 32 into which the filtered clean fluid Q2 flows is formed.

The first drum filter 30 includes a first end portion 30a and second end portion 30b. The first end portion 30a is rotatably supported on the first sidewall 12a of the filter tank 12. The second end portion 30b is rotatably supported on the second sidewall 12b of the filter tank 12. That is, the first drum filter 30 is a "both-end supported" drum filter the first end portion 30a and second end portion 30b of which are supported on the filter tank 12. Although the lower half part of the first drum filter 30 is immersed in the fluid Q1, the upper half part thereof is exposed at the fluid surface Q3 of the filter tank 12. Between the bottom portion 12c of the filter tank 12 and lower surface of the first drum filter 30, a fluid flow path 33 through which the fluid Q1 flows is formed.

The first end portion 30a and second end portion 30b of the first drum filter 30 are respectively provided with a sprocket wheel 34 and sprocket wheel 35. The chains 20 and 21 are respectively engaged with the sprocket wheels 34 and 35. Accordingly, when the chains 20 and 21 are moved, the first drum filter 30 is also rotated. In the first end portion 30a and second end portion 30b, openings 36 and 37 communicating with the inflow chamber 32 are respectively formed. The inflow chamber 32 communicates with the clean tank 11 through the openings 36 and 37.

The second drum filter 40 includes a cylindrical filter main body 41. Similarly to the filter main body 31 of the first drum filter 30, the filter main body 41 is constituted of a perforated plate including filtering throughflow holes or meshed member. A filter main body 31 constituted of a composite material formed by overlaying a meshed member on the outside of a perforated plate may also be employed. Inside the filter main body 41, an inflow chamber 42 into which the filtered clean fluid Q2 flows is formed.

The second drum filter 40 includes an end portion 40a on the supported side and end portion 40b on the non-supported side. The end portion 40a on the supported side is rotatably supported on the first sidewall 12a of the filter tank 12. The end portion 40b on the non-supported side is in a free state without being supported on the filter tank 12. That is, the second drum filter 40 is a single supported (cantilever) drum filter. Although the lower half part of the second drum filter 40 is immersed in the fluid Q1, the upper half part thereof is exposed at the fluid surface Q3 of the filter tank 12.

The end portion 40a of the second drum filter 40 on the supported side is provided with a sprocket wheel 43. The sprocket wheel 43 is engaged with the chain 20. Accordingly, when the chain 20 is moved, the second drum filter 40 is also rotated. In the end portion 40a on the supported side, an opening 46 communicating with the inflow chamber 42 is formed. The inflow chamber 42 communicates with the clean tank 11 through the opening 46.

Figure 4:
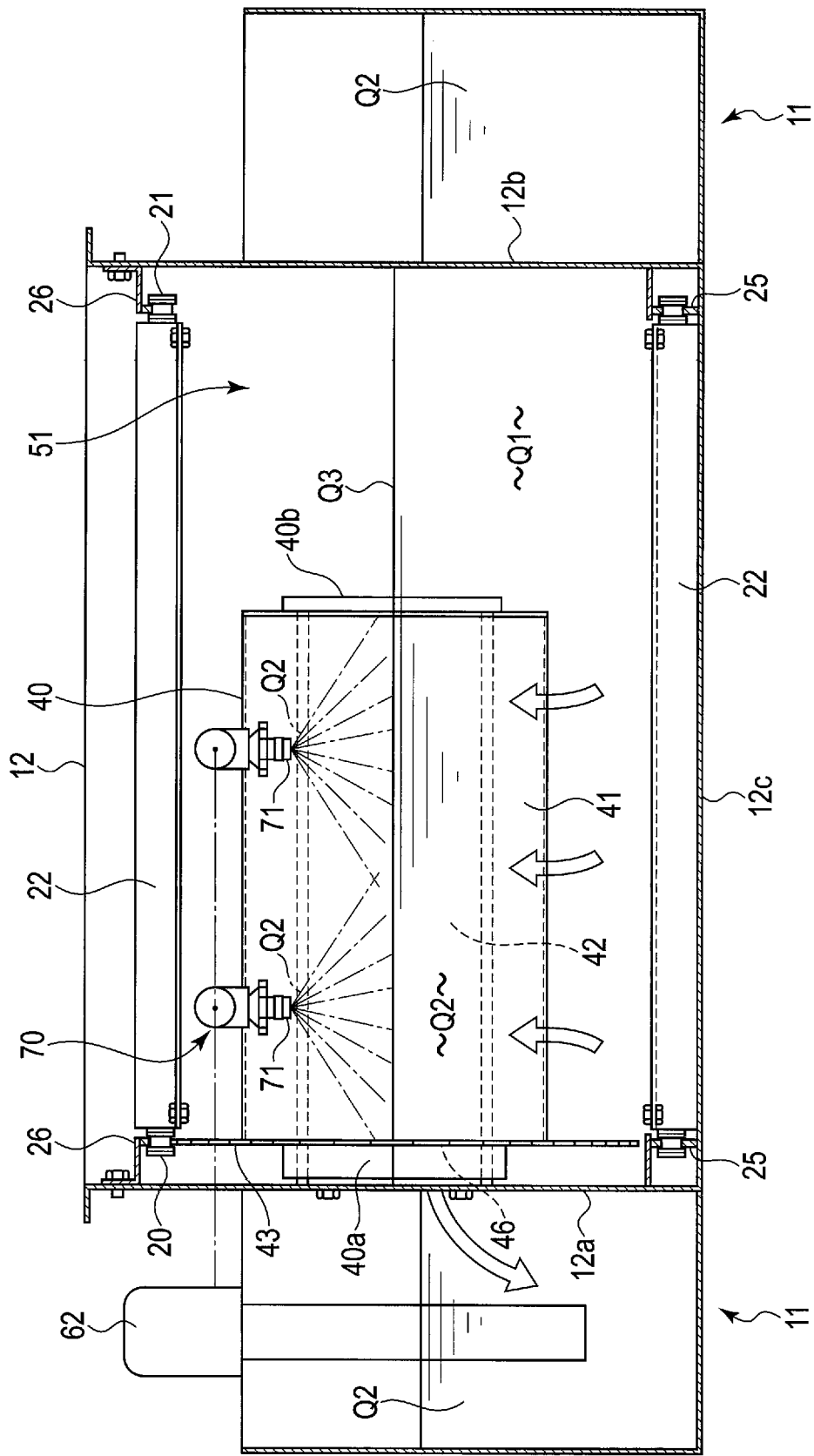
FIG. 4 is a cross-sectional view of the filtering device along line F4-F4 in FIG. 1.

As shown in FIG. 1 and FIG. 2, between the first drum filter 30 and second drum filter 40, a fluid inflow part 50 is formed. The fluid inflow part 50 communicates with the fluid flow path 33 on the lower surface side of the first drum filter 30. As shown in FIG. 2 and FIG. 4, between the second sidewall 12b of the filter tank 12 and end portion 40b of the second drum filter 40 on the non-supported side, a communicating part 51 is formed. The communicating part 51 communicates with the fluid inflow part 50 between the first drum filter 30 and second drum filter 40. Further, this communicating part 51 communicates with a fluid-retention part 52 facing the sludge takeout path 15.

In the vicinity of the first drum filter 30, a first jetting section 60 is provided. The first jetting section 60 includes a plurality of jet nozzles 61 arranged at positions higher than the fluid surface Q3, and fluid supply system 62 (shown in FIG. 2) provided with a pump. The fluid supply system 62 supplies a fluid (for example, the fluid Q2 in the clean tank 11) for cleaning/washing to the jet nozzles 61. The plurality of jet nozzles 61 are arranged at predetermined pitches in the axial direction of the first drum filter 30.

Figure 5:
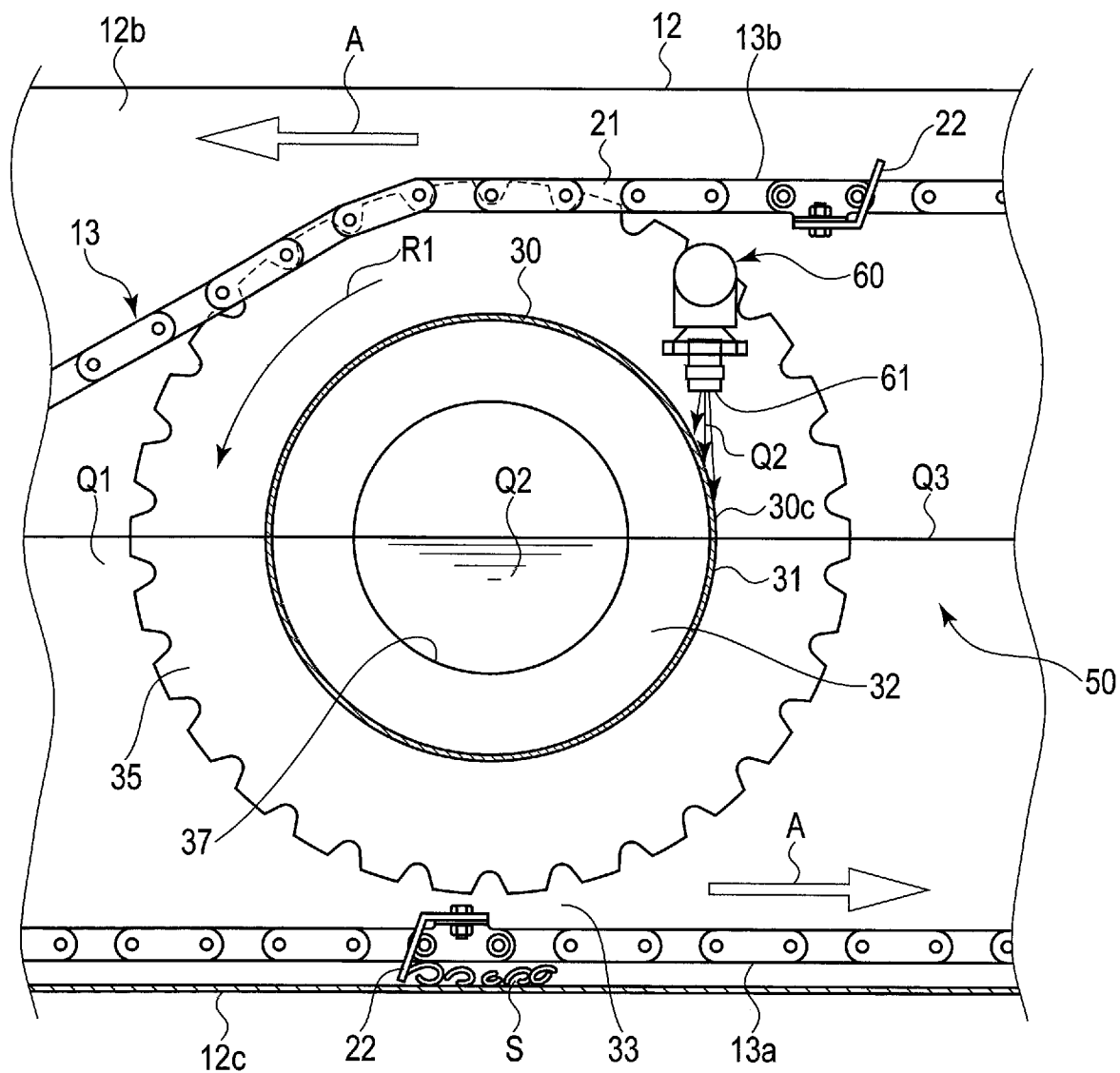
FIG. 5 is a cross-sectional view showing part of the filtering device in an enlarged form.

As shown in FIG. 5 in an enlarged form, the jet nozzle 61 of the first jetting section 60 jets the cleaning fluid (for example, the clean fluid Q2) from above against the outer circumferential surface 30c of the first drum filter 30. The first drum filter 30 rotates in the direction indicated by an arrow R1. This jet nozzle 61 is arranged in such a manner as to jet the clean fluid Q2 in the tangential direction at a position on the outer circumferential surface 30c immediately after emerging from the fluid surface Q3 and just moving in the upward direction among all the positions on the whole circumference of the first drum filter 30.

A second jetting section 70 is provided in the vicinity of the second drum filter 40. The second jetting section 70 includes a plurality of jet nozzles 71 arranged at positions higher than the fluid surface Q3. To the jet nozzles 71, the fluid supply system 62 is connected. The fluid supply system 62 supplies a fluid (for example, the clean fluid Q2 in the clean tank 11) for cleaning/washing to the jet nozzles 71. The plurality of jet nozzles 71 are arranged at predetermined pitches in the axial direction of the second drum filter 40.

The jet nozzle 71 of the second jetting section 70 jets the cleaning fluid (for example, the clean fluid Q2) from above against the outer circumferential surface 40c of the second drum filter 40. The second drum filter 40 rotates in the direction indicated by an arrow R2 in FIG. 1. This jet nozzle 71 is arranged in such a manner as to jet the clean fluid Q2 in the tangential direction at a position on the outer circumferential surface 40c immediately after emerging from the fluid surface Q3 and just moving in the upward direction among all the positions on the whole circumference of the second drum filter 40.

Between the first drum filter 30 and second drum filter 40, the fluid inflow part 50 is formed. Above the fluid inflow part 50, a jet nozzle 80 (shown in FIG. 2 and FIG. 3) functioning as flow promoting means is arranged. This jet nozzle 80 is connected to the fluid supply system 62, and jets the fluid Q2 against the fluid surface of the fluid inflow part 50. Moreover, this jet nozzle 80 jets the fluid Q2 from diagonally above against the fluid surface of the fluid inflow part 50 in the direction to the communicating part 51 in such a manner as to direct the fluid Q2 in the vicinity of the fluid surface of the fluid inflow part 50 toward the communicating part 51.

Next, a function of the filtering device 10 of the aforementioned configuration will be described below.

The fluid Q1 discharged from the machine tool 1 is supplied to the filter tank 12 through the flow path 2. The sludge S (schematically shown in FIG. 1 and FIG. 5) containing shavings is sunken on the bottom portion 12c of the filter tank 12. This sludge S is conveyed to the discharging section 16 by the scrapers 22 by the movement of the conveyor 13. Then, the sludge S is made to fall from the discharging section 16 into the collection box 27.

The object to be removed such as shavings, minute particles, and the like is contained in the fluid Q1. This fluid Q1 is filtered by being made to pass through the filtering throughflow holes from outside the first drum filter 30, and flows into the inflow chamber 32 inside the drum filter 30. The clean fluid Q2 which has flowed into the inflow chamber 32 then flows into the clean tank 11 through the openings 36 and 37.

Part of the fluid Q1 inside the filter tank 12 is filtered by being made to pass through the filtering throughflow holes from outside the second drum filter 40, and flows into the inflow chamber 42 inside the drum filter 40. The clean fluid Q2 which has flowed into the inflow chamber 42 then flows into the clean tank 11 through the opening 46. The fluid Q2 inside the clean tank 11 is drawn up by the pump 3 and is then supplied to the machine tool 1 again through the supply flow path 4. Accordingly, it is possible to supply the filtered clean coolant (fluid Q2) to the machine tool 1.

As shown in FIG. 5, the fluid Q2 jetted from the first jet nozzles 61 rushes toward the first drum filter 30. The fluid Q2 jetted from the first jet nozzles 61 is dashed against the outer circumferential surface 30c approximately in the tangential direction thereof from above the first drum filter 30. Thereby, the sludge adhering to the first drum filter 30 is removed, and clogging of the first drum filter 30 is prevented from occurring. The fluid Q2 jetted from the second jet nozzles 71 rushes toward the second drum filter 40. The fluid Q2 jetted from the second jet nozzles 71 is dashed against the outer circumferential surface 40c approximately in the tangential direction thereof from above the second drum filter 40. Thereby, the sludge adhering to the second drum filter 40 is removed, and clogging of the second drum filter 40 is prevented from occurring.

The sludge removed from the outer circumferential surface 30c of the first drum filter 30 falls into the fluid inflow part 50 between the first drum filter 30 and second drum filter 40. A fluid flow (shown in FIG. 2 by an arrow Y1) moving toward the communicating part 51 is created in the vicinity of the fluid surface of the fluid inflow part 50 by the jet nozzle 80 functioning as the flow promoting means. Accordingly, the sludge inside the fluid inflow part 50 moves toward the communicating part 51 together with the fluid in the vicinity of the fluid surface.

As indicated by an arrow Y2, in the communicating part 51, the fluid Q2 in the vicinity of the fluid surface moves toward the fluid-retention part 52 continuous with the sludge takeout path 15. Then the sludge that has moved to the fluid-retention part 52 is conveyed to the discharging section 16 by the scrapers 22 of the conveyor 13. Accordingly, the sludge drifting in the vicinity of the fluid surface of the fluid inflow part 50 is prevented from collecting in the vicinity of the fluid surface between the first drum filter 30 and second drum filter 40.

According to the filtering device 10 of this embodiment, the plurality of drum filters (first drum filter 30 and second drum filter 40) are employed, and thus it is possible to enhance the filtering capability. The first jetting section 60 jets the fluid for cleaning against the outer circumferential surface 30c of the first drum filter 30 from the position higher than the fluid surface Q3. The second jetting section 70 also jets the fluid for cleaning against the outer circumferential surface 40c of the second drum filter 40 from the position higher than the fluid surface Q3.

Accordingly, both the upper half part of the first drum filter 30 and upper half part of the second drum filter 40 need to be exposed at the fluid surface Q3. Supposing that the second drum filter 40 is also a both-end supported drum filter as in the case of the first drum filter 30, a closed fluid inflow part is formed between the first drum filter 30 and second drum filter 40. The sludge drifts in the vicinity of the fluid surface of the closed fluid inflow part continuously for a long time and collects there without being discharged, whereby problems are caused.

Conversely, in the filtering device 10 of this embodiment, the opened communicating part 51 is formed between the end portion 40b of the cantilever second drum filter 40 on the non-supported side and sidewall 12b of the filter tank 12. Accordingly, it is possible to move the sludge inside the fluid inflow part 50 to the communicating part 51. Moreover, the flow of the fluid in the vicinity of the fluid surface of the fluid inflow part 50 is promoted by the jet nozzle 80. Therefore, it is possible to cause the sludge drifting in the vicinity of the fluid surface of the fluid inflow part 50 to move toward the communicating part 51 together with the fluid in the vicinity of the fluid surface within a short time.

The filtering device 10 of this embodiment can prevent clogging of the drum filters 30 and 40 from occurring by the jetting section 60 and 70 without using a contact-type scraper. Accordingly, it has become possible to prevent abrasion and deformation of the drum filters 30 and 40 from occurring, and greatly improve the durability of the drum filters 30 and 40. Further, the maintenance of the filtering device 10 is facilitated in such a manner that the exchange frequency or the like of the drum filters 30 and 40 is reduced.

Figure 6:
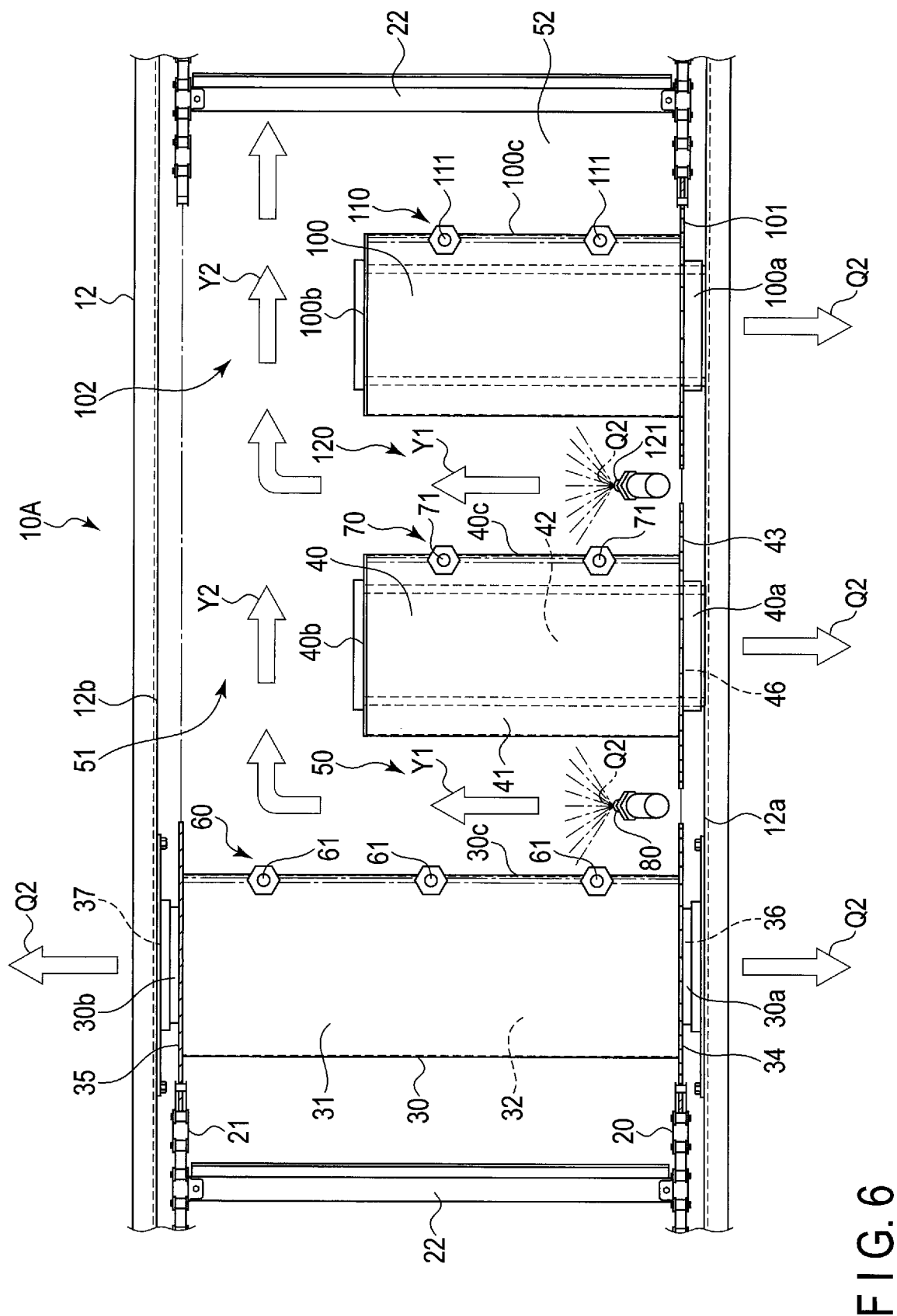
FIG. 6 is a plan view of a filtering device according to a second embodiment.

FIG. 6 shows a filtering device 10A according to a second embodiment. This filtering device 10A includes a first drum filter 30 both ends of which are supported, cantilever second drum filter 40, and cantilever third drum filter 100. This filtering device 10A includes three drum filters 30, 40, and 100, and hence it is possible for the filtering device 10A to enhance the filtering capability to a greater extent than the filtering device 10 of the first embodiment (FIGS. 1 to 5).

As shown in FIG. 6, an end portion 100a of the third drum filter 100 on the supported side is rotatably supported on the first sidewall 12a of the filter tank 12. The end portion 100a on the supported side is provided with a sprocket wheel 101. An end portion 100b on the non-supported side is in a free state without being supported on the second sidewall 12b. Between the end portion 100b on the non-supported side and second sidewall 12b, a communicating part 102 is formed. In the vicinity of the third drum filter 100, a third jetting section 110 is provided. The third jetting section 110 includes a plurality of jet nozzles 111 arranged at positions higher than the fluid surface Q3. To the jet nozzles 111, a fluid supply system 62 (shown in FIG. 2) identical to the first embodiment is connected. The jet nozzle 111 jets the cleaning fluid (for example, the clean fluid Q2) from above against the outer circumferential surface 100c of the third drum filter 100. This jet nozzle 111 is arranged in such a manner as to jet the clean fluid Q2 in the tangential direction at a position on the outer circumferential surface 100c immediately after emerging from the fluid surface and just moving in the upward direction among all the positions on the whole circumference of the third drum filter 100.

Between the second drum filter 40 and third drum filter 100, a fluid inflow part 120 is formed. Above the fluid inflow part 120, a jet nozzle 121 functioning as flow promoting means is arranged. The jet nozzle 121 jets the clean fluid Q2 from diagonally above the fluid surface in the direction to the communicating part 102 in such a manner as to direct the fluid in the vicinity of the fluid surface of the fluid inflow part 120 toward the communicating part 102. Accordingly, it is possible to move the sludge inside the fluid inflow part 120 toward the communicating part 102 together with the fluid in the vicinity of the fluid surface. The configurations and functions other than the above are common to this filtering device 10A and filtering device 10 of the first embodiment, and hence parts common to both the filtering devices 10A and 10 are denoted by reference symbols common to both the filtering devices 10A and 10, and descriptions of the parts are omitted.

Figure 7:
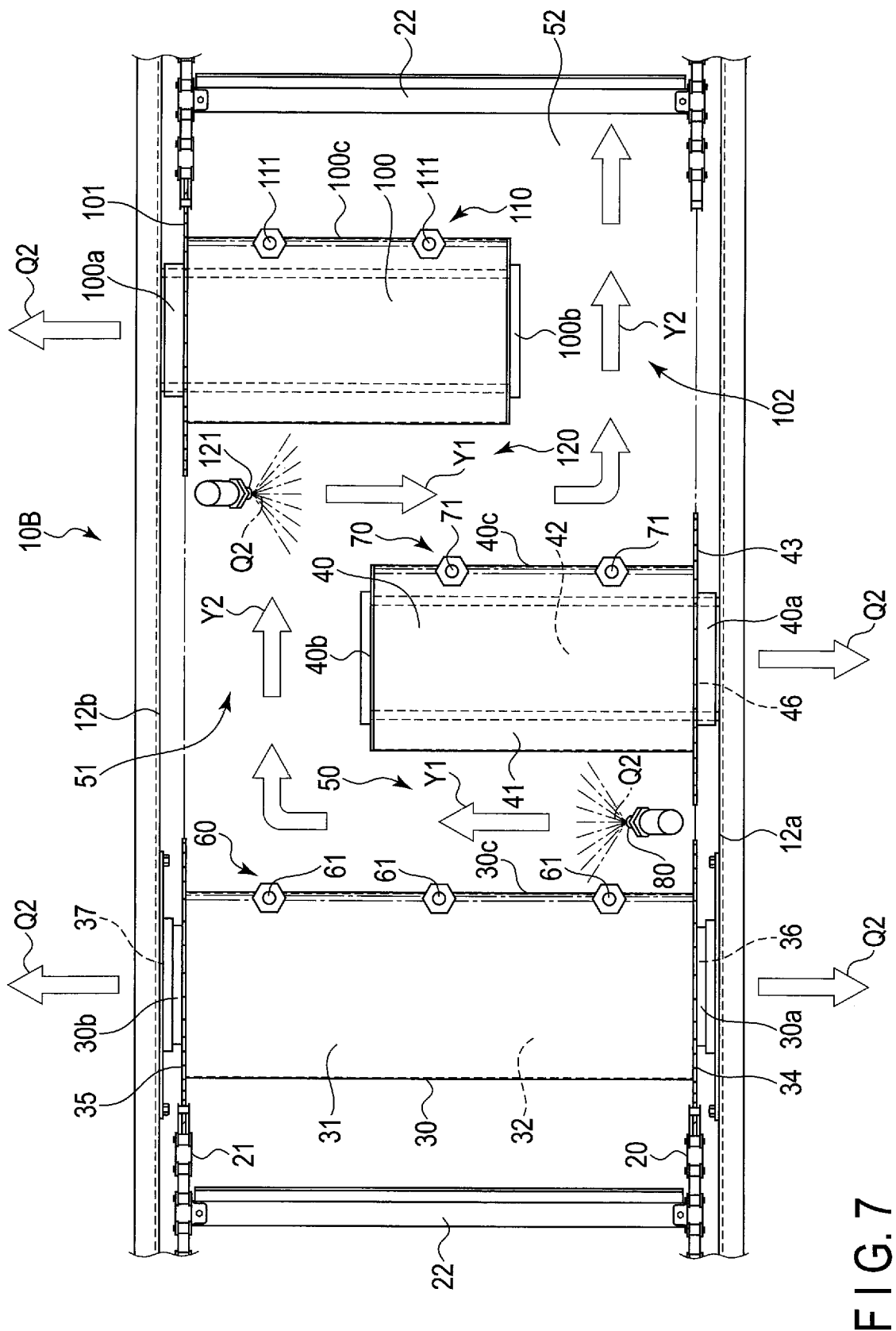
FIG. 7 is a plan view of a filtering device according to a third embodiment.

FIG. 7 shows a filtering device 10B according to a third embodiment. This filtering device 10B also includes a first drum filter 30 both ends of which are supported, and cantilever second drum filter 40, and cantilever third drum filter 100. As shown in FIG. 7, an end portion 100a of the third drum filter 100 on the supported side is rotatably supported on the second sidewall 12b of the filter tank 12. The end portion 100a on the supported side is provided with a sprocket wheel 101. An end portion 100b on the non-supported side is in a free state without being supported on the first sidewall 12a. Between the end portion 100b on the non-supported side and first sidewall 12a, a communicating part 102 is formed.

In the filtering device 10B of this embodiment, the end portion 40a of the second drum filter 40 on the supported side is supported on the first sidewall 12a. The end portion 100a of the third drum filter 100 on the supported side is supported on the second sidewall 12b. In this case, it is possible to support the weight of the two cantilever drum filters 40 and 100 by evenly distributing the weight on the first sidewall 12a and second sidewall 12b, and hence it is possible to reduce the strength-wise burden on the filter tank 12. The configurations and functions other than the above are common to this filtering device 10B and filtering device 10A of the second embodiment, and hence parts common to both the filtering devices 10B and 10A are denoted by reference symbols common to both the filtering devices 10B and 10A, and descriptions of the parts are omitted.

In implementing the present invention, it is needless to say that the specific configuration and arrangement and the like of the elements constituting the filtering device such as the filter tank, conveyor, drum filters, first jetting section, and second jetting section can be variously changed to implement the present invention. For example, the number of cantilever drum filters may be three or more. Further, the first jetting section and second jetting section may jet a fluid other than the clean fluid.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A filtering device comprising:
    a filter tank comprising a first sidewall and a second sidewall opposed to each other;
    a first drum filter comprising a first end portion supported on the first sidewall and a second end portion supported on the second sidewall;
    a cantilever second drum filter comprising an end portion on the supported side supported on the first sidewall;

a fluid inflow passage formed between the first drum filter and the second drum filter;

a fluid-retention passage formed in the filter tank;

a communicating passage which communicates with the fluid inflow passage and the fluid-retention passage, the communicating passage being formed between an end portion of the second drum filter on the non-supported side and the second sidewall;

a drive mechanism which rotates the first drum filter and the second drum filter;

a first jetting structure comprising a first jet nozzle and a fluid supply system, wherein the first jet nozzle jets a fluid supplied by the fluid supply system against an outer circumferential surface of the first drum filter;

a second jetting structure comprising a second jet nozzle and the fluid supply system, wherein the second jet nozzle jets the fluid supplied by the fluid supply system against an outer circumferential surface of the second drum filter; and a conveyor which discharges the sludge inside the filter tank to the outside of the filter tank.

2. The filtering device of claim 1, wherein an upper portion of the first drum filter is exposed at a fluid surface of a fluid inside the filter tank, and the first jet nozzle jets the fluid from above against the outer circumferential surface of the first drum filter emerging from the fluid surface.

3. The filtering device of claim 2, wherein
the first jet nozzle jets the fluid in a tangential direction of the outer circumferential surface of the first drum filter.

4. The filtering device of claim 1, wherein
an upper portion of the second drum filter is exposed at a fluid surface of a fluid inside the filter tank, and the second jet nozzle jets the fluid from above against the outer circumferential surface of the second drum filter emerging from the fluid surface.

5. The filtering device of claim 4, wherein
the second jet nozzle jets the fluid in a tangential direction of the outer circumferential surface of the second drum filter.

6. The filtering device of claim 1, further comprising a jet nozzle provided on the fluid inflow passage for moving fluid in a vicinity of a fluid surface of the fluid inflow passage toward the communicating passage.

7. A filtering device comprising:

a filter tank comprising a first sidewall and a second sidewall opposed to each other;

a flow passage which supplies a fluid containing therein an object to be removed to the filter tank;

a sludge takeout passage formed between a discharging outlet provided at a position higher than a fluid surface of the filter tank and a bottom portion of the filter tank;

a conveyor comprising a lower portion moving from the sludge takeout passage toward the discharging outlet;

a first drum filter comprising a first end portion supported on the first sidewall and a second end portion supported on the second sidewall and which filters the fluid supplied from the flow passage to the filter tank;

a cantilever second drum filter comprising an end portion on the supported side supported on the first sidewall, arranged between the first drum filter and the sludge takeout passage, and which filters the fluid inside the filter tank;

a fluid inflow passage formed between the first drum filter and the second drum filter and communicating with a fluid flow passage on the lower surface side of the first drum filter;

a communicating passage formed between an end portion of the second drum filter on the non-supported side and the second sidewall and communicating with the fluid inflow passage;

a fluid-retention passage communicating with the communicating passage and facing the sludge takeout passage;

a drive mechanism which rotates the first drum filter and the second drum filter;

a first jetting structure comprising a first jet nozzle and a fluid supply system, wherein the first jet nozzle jets a fluid supplied by the fluid supply system against an outer circumferential surface of the first drum filter; and a second jetting structure comprising a second jet nozzle and the fluid supply system, wherein the second jet nozzle jets the fluid supplied by the fluid supply system against an outer circumferential surface of the second drum filter.

8. The filtering device of claim 7, wherein
an upper portion of the first drum filter is exposed at a fluid surface of the fluid inside the filter tank, and the first jet nozzle jets the fluid from above against the outer circumferential surface of the first drum filter emerging from the fluid surface.

9. The filtering device of claim 8, wherein
the first jet nozzle jets the fluid in a tangential direction of the outer circumferential surface of the first drum filter.

10. The filtering device of claim 7, wherein
an upper portion of the second drum filter is exposed at a fluid surface of a fluid inside the filter tank, and the second jet nozzle jets the fluid from above against the outer circumferential surface of the second drum filter emerging from the fluid surface.

11. The filtering device of claim 10, wherein
the second jet nozzle jets the fluid in a tangential direction of the outer circumferential surface of the second drum filter.

12. The filtering device of claim 7, further comprising a jet nozzle which moves the fluid in a vicinity of a fluid surface of the fluid inflow passage toward the communicating passage, the jet nozzle being provided on the fluid inflow passage formed between the first drum filter and the second drum filter.

* * * * *